US009660696B2

(12) United States Patent
Su

(10) Patent No.: US 9,660,696 B2
(45) Date of Patent: May 23, 2017

(54) POWER LINE COMMUNICATION AC/DC ADAPTOR

(71) Applicants: Asys Corporation, Hsinchu (TW); IOT Technology Corporation, Hsinchu (TW)

(72) Inventor: Tzu-Chieh Su, Zhubei (TW)

(73) Assignees: Asys Corporation, Hsinchu (TW); IOT Technology Corporation, Hsinchu (TW)

(*) Notice: Subject to any disclaimer, the term of this patent is extended or adjusted under 35 U.S.C. 154(b) by 4 days.

(21) Appl. No.: 14/850,967

(22) Filed: Sep. 11, 2015

(65) Prior Publication Data

US 2016/0080036 A1    Mar. 17, 2016

Related U.S. Application Data

(60) Provisional application No. 62/049,375, filed on Sep. 12, 2014.

(51) Int. Cl.
*H02M 1/12* (2006.01)
*H04B 3/54* (2006.01)
*H02M 1/44* (2007.01)
*H02M 1/42* (2007.01)

(52) U.S. Cl.
CPC ............ *H04B 3/548* (2013.01); *H02M 1/126* (2013.01); *H02M 1/44* (2013.01); *H02M 1/4208* (2013.01); *H02M 2001/123* (2013.01); *Y02B 70/126* (2013.01)

(58) Field of Classification Search
CPC ...... H02M 3/22; H02M 3/24; H02M 3/33507; H02M 2007/4818
USPC ....... 363/15, 21.01–21.18, 34, 44, 125, 126, 363/229
See application file for complete search history.

(56) References Cited

U.S. PATENT DOCUMENTS

| 7,531,922 | B1* | 5/2009 | Olson | H05B 37/0263 307/157 |
| 2008/0068141 | A1 | 3/2008 | Yokomitsu et al. | |
| 2010/0027599 | A1 | 2/2010 | Di Chiro et al. | |
| 2011/0175543 | A1* | 7/2011 | Sun | H05B 33/0818 315/291 |
| 2015/0334800 | A1* | 11/2015 | Fawaz | H05B 33/0812 315/294 |

* cited by examiner

*Primary Examiner* — Adolf Berhane
*Assistant Examiner* — Afework Demisse
(74) *Attorney, Agent, or Firm* — Steven Reiss

(57) ABSTRACT

A power line communication (PLC) AC/DC adaptor includes a filter, a rectifier, a power factor correction circuitry, and a PLC module. The filter includes a differential mode choke and a common mode choke. The differential mode choke is coupled to AC. The common mode choke is coupled to the differential mode choke. The rectifier is coupled to the common mode choke. The power factor correction circuitry is coupled to the rectifier. The PLC module is coupled to AC to process a PLC signal from AC and output a control signal.

16 Claims, 7 Drawing Sheets

POWER LINE COMMUNICATION AC/DC ADAPTOR

FIELD

The present disclosure relates generally to the design of a power line communication AC/DC adaptor. More specifically, the present disclosure relates to utilizing a differential mode choke without a capacitor coupled to an input to design a novel power line communication AC/DC adaptor, so that the power line communication AC/DC adaptor can be compatible to any existing power line communication network.

BACKGROUND

Power line communication (hereinafter referred to as PLC) has become a popular control technology for the advantage of utilizing existing electric transmission and distribution power lines within buildings or other structures to transmit signals, so the home appliances or network electronic devices are able to be coupled to other networks, such as the Internet, and thus communication or control scheme can be conducted among the networks with devices.

However, when power line communication is applied to control lighting or other kinds of applications, the following issues arise:

1. Low tolerance to interference: the most common interference comes from the noise of devices coupled to power line when power line is used to carry power and carrier signal;
2. High power consumption: generally, the equivalent impedance of an indoor power line system is about 2 to 10 ohms, and a conventional power line communication modem outputs large current in low impedance circumstance, thus causing a high overall power consumption;
3. Low compatibility: the power factor of each of the devices coupled to power line is affected when power line is used to carry power and carrier signal, and thus a current light adjusting circuit or the corresponding devices need to be redesigned before integrated into a power line communication network.

In view of the above, there is a need for a power line communication AC/DC adaptor that provides higher tolerance to interference, lower power consumption and high compatibility with any existing power line communication network.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

In accordance with common practice, the various described features are not drawn to scale and are drawn to emphasize features relevant to the present disclosure. Like reference characters denote like elements throughout the figures and text.

DETAILED DESCRIPTION

Figure 1:
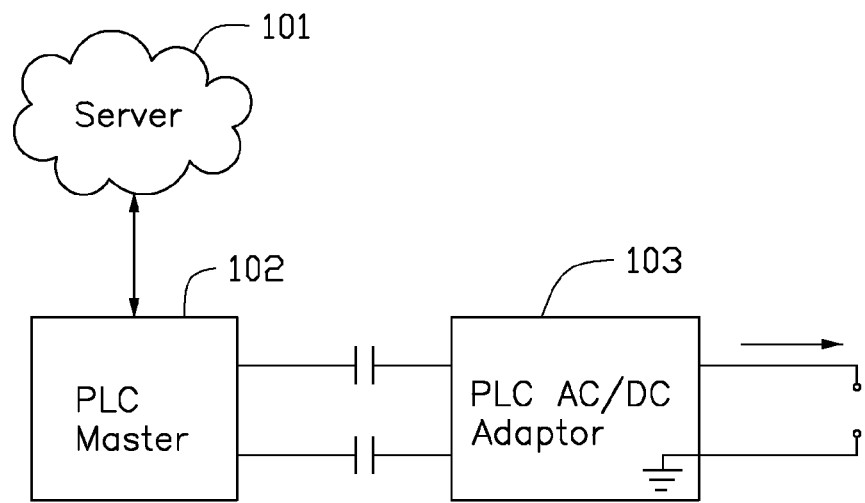
FIG. 1 is an application scheme integrated with a PLC network according to at least one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "comprising," when utilized, means "including, but not necessarily limited to"; it specifically indicates open-ended inclusion or membership in the so-described combination, group, series and the like.

The following disclosure is now described in relation to the accompanying drawings in FIGS. 1-6. Reference will be made to the drawings to describe the present disclosure in detail, wherein depicted elements are not necessarily drawn to scale and wherein like or similar elements are designated by same or similar reference numeral through the several views and same or similar terminology.

FIG. 1 is an application scheme integrated with a PLC network according to at least one embodiment of the present disclosure. Such network can be set up at home, office or other public/private domain, to control lights, heat, televisions, computers, game consoles, or other electronic devices coupled to the network. FIG. 1 illustrates the PLC network comprises but not limited to a server 101, a PLC master 102 and a PLC AC/DC adaptor 103.

Server 101 is coupled to a PLC master 102 via the Internet or other communication protocol, and physical medium or wireless communication can be utilized. In addition, the PLC master 102 is coupled to a PLC AC/DC adaptor 103 through power line or other physical medium. The PLC AC/DC adaptor 103 is configured to transmit power and control signals to loads, such as home appliances or any other kinds of electronic devices.

The PLC AC/DC adaptor 103 can include temperature sensing functions or power consumption measurement ability. The power consumption measurement function can be achieved by using an E-meter or a programmed reference efficiency table. The programmed reference efficiency table provides the information for the adaptor to map input AC current to output power. Thus, the PLC AC/DC adaptor 103 is able to feedback power consumption status to PLC master 102.

Figure 2:
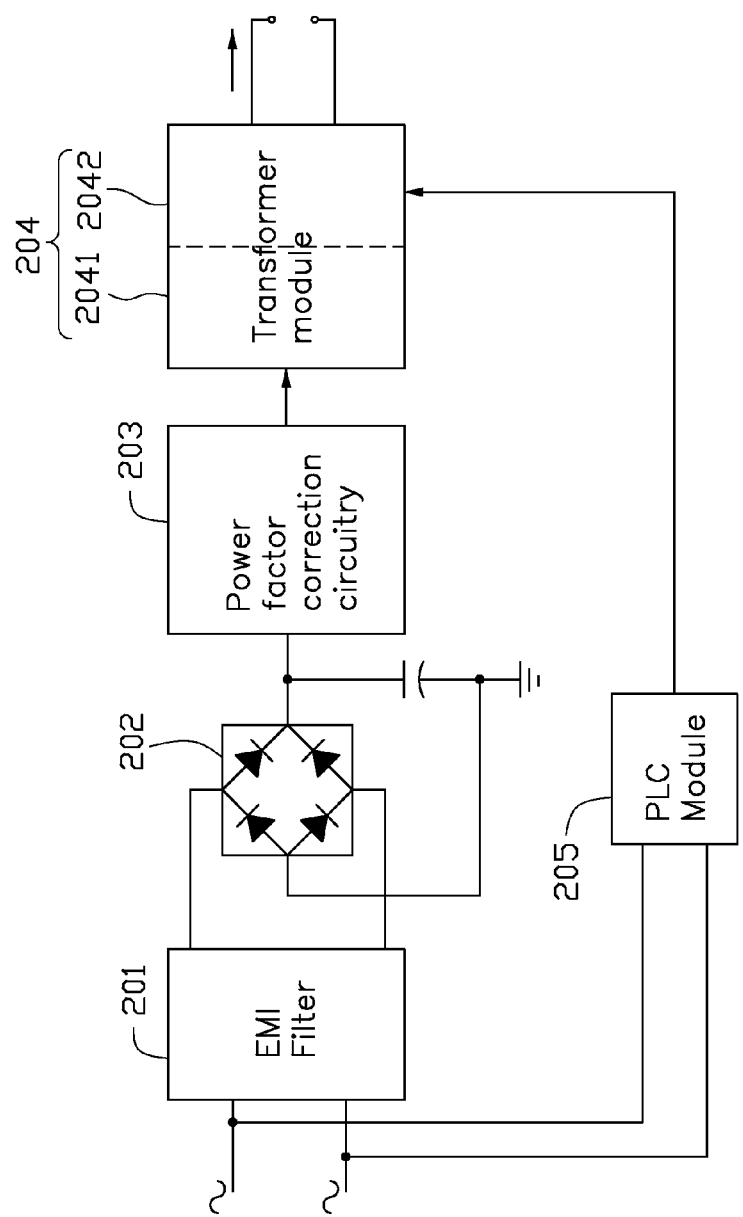
FIG. 2 is a schematic diagram of a PLC AC/DC adaptor according to one embodiment of the present disclosure.

FIG. 2 is a schematic diagram of a PLC AC/DC adaptor according to one embodiment of the present disclosure. FIG. 2 illustrates a PLC AC/DC adaptor can comprise but is not limited to an EMI filter 201, a full bridge rectifier 202, a power factor correction circuitry 203, a transformer module 204, and a PLC module 205.

FIG. 2 illustrates the inputs of both the EMI filter 201 and the PLC module 205 are electrically coupled to AC input. The output of the EMI filter 201 passes through the full bridge rectifier 202 and the power factor correction circuitry 203 is electrically coupled to the outputs of the full bridge rectifier 202. In addition, the outputs of both the power factor correction circuitry 203 and the PLC module 205 are electrically coupled to the transformer module 204. The EMI filter 201 receives a PLC signal from AC. The PLC signal is processed by the EMI filter 201, the full bridge rectifier 202, and the power factor correction circuitry 203 in that order. The power factor correction circuitry 203 outputs a power signal to the transformer module 204. The PLC module 205 can process the PLC signal from AC and output a first control signal to the transformer module 204. Then, the transformer module 204 transmits power and control signals to a load. In the embodiment, a dash line in the transformer module 204 illustrates that a primary side 2041 and a secondary side 2042 of the transformer 204 are isolated from each other. In the embodiment, the output of the PLC module 205 is electrically coupled to a controller in the secondary side 2042 of the transformer module 204, so that a specific control mechanism to the load can be realized. Thus, the controller can process the first control signal into a second control signal to realize the specific control mechanism. Also, the transformer module 204 can be replaced by a output power stage control module so that a non-isolation design of the PLC AC/DC adaptor can be realized.

The full bridge rectifier 202 can be replaced by half bridge rectifier or other circuitry with the same function. In addition, the power factor correction circuitry 203 functions as a power switch with a frequency range between 60 KHz to 120 KHz. Typically, the frequency applied is less than 200 KHz. Moreover, the transformer 204 can serve as a second stage power switch. It can transform higher DC voltage to lower DC voltage. For example, the transformer 204 can transform 400 volt DC to 36 volt DC.

Figure 3:
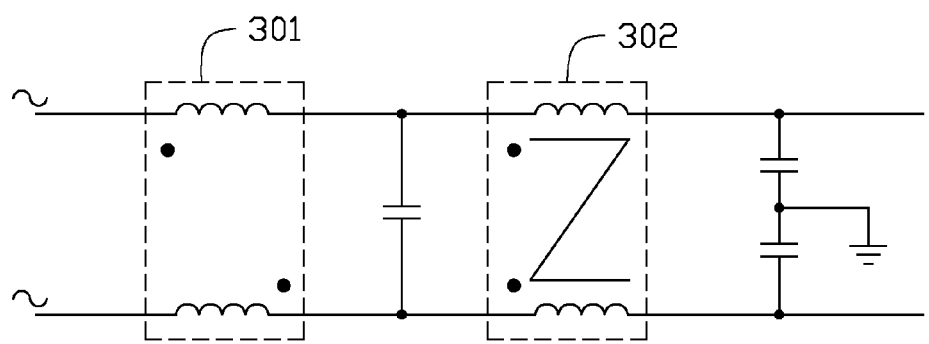
FIG. 3 is a schematic diagram that illustrates more details of the EMI filter in FIG. 2 according to one embodiment of the present disclosure.

FIG. 3 is a schematic diagram that illustrates more details of the EMI filter 201 in FIG. 2 according to one embodiment of the present disclosure. FIG. 3 illustrates the EMI filter 201 can comprise a differential mode choke 301 and a common mode choke 302.

In FIG. 3, the input of the differential mode choke 301 is electrically coupled to AC input and the output of the differential mode choke 301 is electrically coupled to common mode choke 302. Therefore, the differential mode signal from AC input will be blocked and then the common mode signal will be blocked. In the embodiment, there is no capacitor electrically coupled to the inputs of the differential mode choke 301 since this specific design of the EMI filter 201 needs to be integrated with the design of the PLC module 205 so that the PLC module is able to receive signals with good quality. The aforementioned design can be compared with the conventional design depicted in FIGS. 4 and 5 in the following paragraph.

Figure 4:
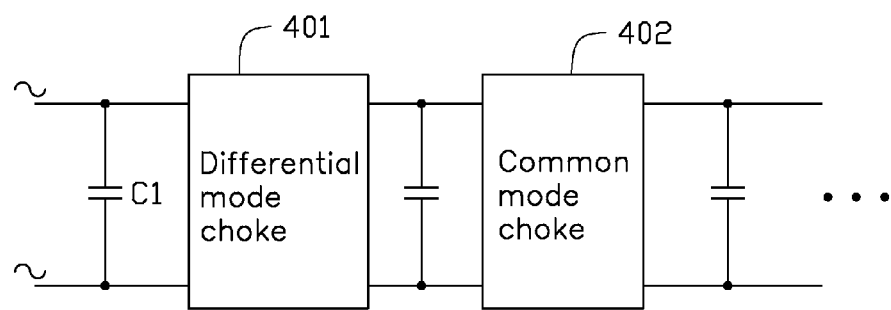
FIG. 4 and FIG. 5 are schematic diagrams that illustrate the details a conventional EMI filter in an AC/DC adaptor.
Figure 5:
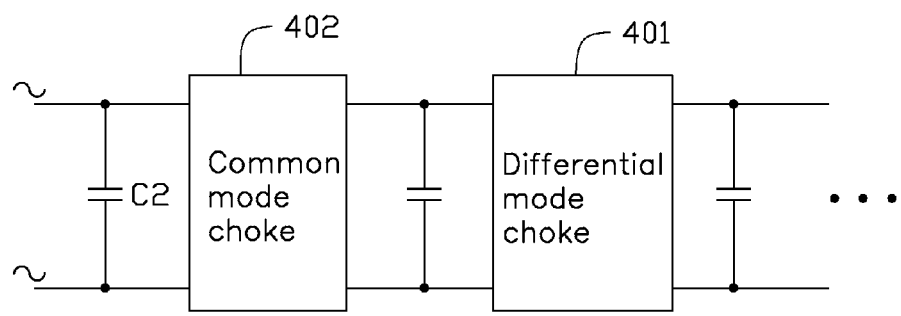

FIG. 4 and FIG. 5 are schematic diagrams that illustrate the details a conventional EMI filter in an AC/DC adaptor.

FIG. 4 or 5 illustrate, the EMI filter can comprise a differential mode choke 401, and a common mode choke 402. In the embodiment, a capacitor C1 is electrically coupled to the input of the differential mode choke 401 in FIG. 4. A capacitor C2 is electrically coupled to the input of the common mode choke 402 in FIG. 5. In present design of the conventional EMI filter, sequence of the differential mode choke 401 and the common mode choke 402 makes no difference to the output of the EMI filter.

Figure 6:
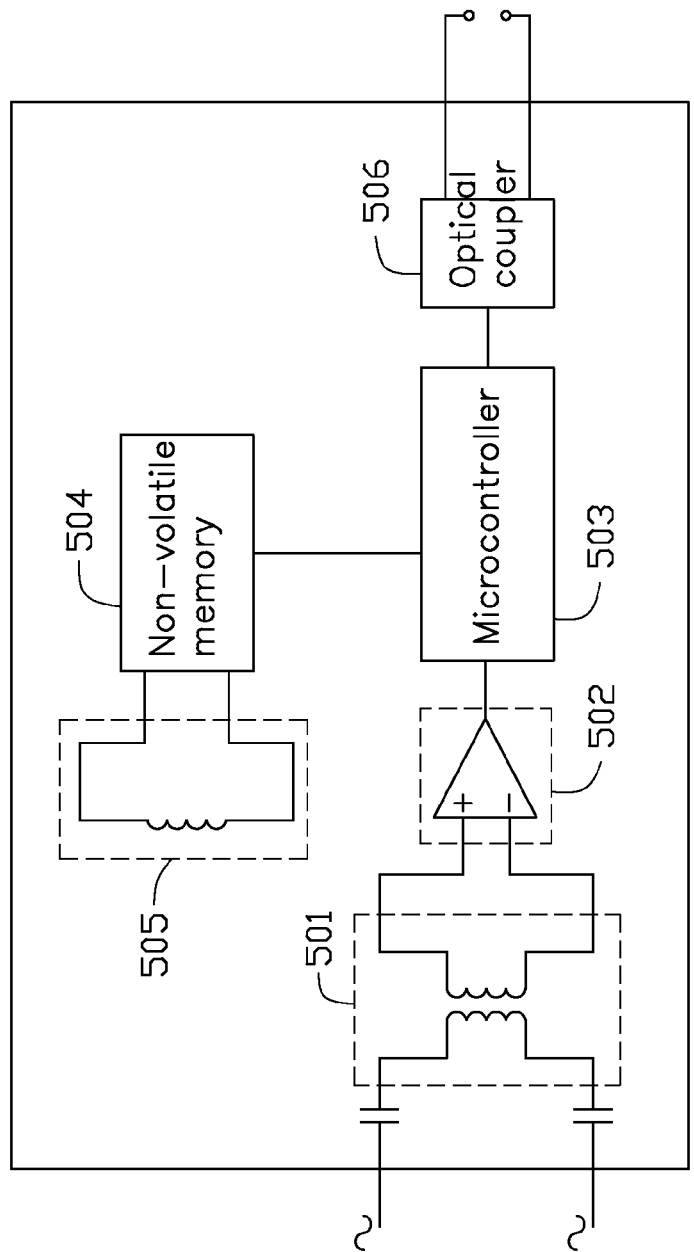
FIG. 6 is a schematic diagram that illustrates more details of the PLC module in FIG. 2 according to one embodiment of the present disclosure.

FIG. 6 is a schematic diagram that illustrates more details of the PLC module 205 in FIG. 2 according to one embodiment of the present disclosure. FIG. 6 illustrates, the PLC module 205 can comprise an intermediate frequency transformer 501, an operational amplifier 502, a microcontroller 503, a non-volatile memory 504, a radio frequency (RF) antenna 505, and an optical coupler 506. The operational amplifier can be replaced by a carrier signal amplifier so that the PLC module 205 can be realized in a digital-circuit design.

In FIG. 6, the input of the intermediate frequency transformer 501 is electrically coupled to AC input and the output of the intermediate frequency transformer 501 is electrically coupled to the input of the operational amplifier 502. The output of the operational amplifier 502 is electrically connected to the microcontroller 503. In addition, the microcontroller 503 is electrically coupled to the non-volatile memory 504 and the optical coupler 506. Moreover, the RF antenna 505 is electrically coupled to the non-volatile memory 504.

The intermediate frequency transformer 501 can transform but is not limited to 300 KHz input PLC carrier signal, which is carried by the AC input signal. In addition, the microcontroller 503 can also be other type of processors, such as digital signal processor (DSP), as long digital demodulation or software defined demodulation can be performed. The microcontroller 503 can be integrated with analog-to-digital rectifier circuitry or non-volatile memory circuitry.

The electrical connection between the microcontroller 503 and the non-volatile memory 504 can be following inter-integrated circuit (I2C), serial peripheral interface (SPI) or other communication protocols.

Moreover, the RF antenna 505 receives energy and transmits information to the non-volatile memory 504. The non-volatile memory 504 can be able to hold information received from the RF antenna 505 even when the non-volatile memory 504 is not powered. Therefore, the microcontroller 503 can be able to read the information held by the non-volatile memory 504 when the PLC module 205 is powered, thus facilitating the manufacturing and installation process of the PLC AC/DC adaptor.

Figure 7:
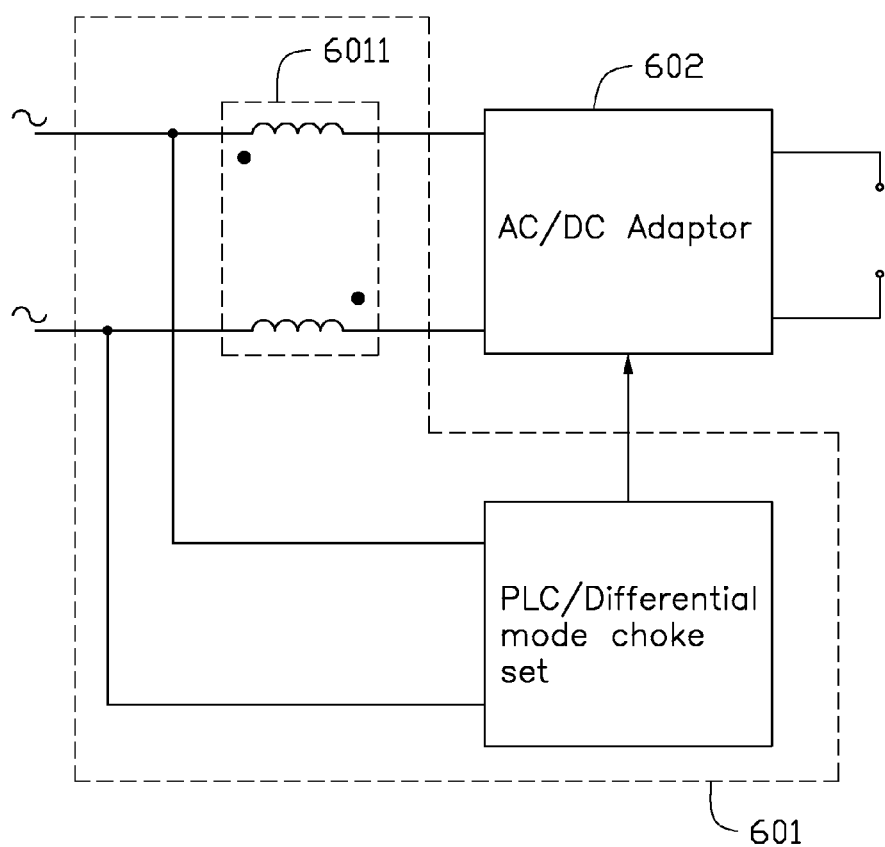
FIG. 7 is a schematic diagram of a PLC AC/DC adaptor according to another embodiment of the present disclosure.

FIG. 7 is a schematic diagram of a PLC AC/DC adaptor according to another embodiment of the present disclosure. FIG. 7 illustrates a PLC AC/DC adaptor can comprise but is not limited to combination of a PLC/differential mode choke set 601 and an AC/DC adaptors 602. In the embodiment, the design of the PLC/differential mode choke set 601 makes it possible to function with any type of AC/DC adaptor.

In FIG. 7, the input of the PLC/differential mode choke set 601 is electrically coupled to AC input and the output of the PLC/differential mode choke set 601 is electrically coupled to the AC/DC adaptor 602 via a differential mode choke 6011.

In addition, the PLC/differential choke set 601 can comprise but not limited to the differential mode choke 6011 and a PLC module 6012. The input of the differential mode choke 6011 and that of the PLC module 6012 are electrically coupled to AC input. The PLC module 6012 processes a PLC signal from AC and outputs a first control signal through the AC/DC adaptor 602.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. A power line communication (PLC) AC/DC adaptor, comprising:
    a filter, the filter comprising a differential mode choke and a common mode choke, an input of the differential mode choke being coupled to a power line carrying a PLC signal and an alternating current to block the PLC signal, and an output of the differential mode choke being coupled to the common mode choke;
    a rectifier coupled to an output of the common mode choke;
    a power factor correction circuitry coupled to the rectifier;
    a transformer module, the transformer module comprising a primary side and a secondary side, wherein the primary side is coupled to an output of the power factor correction circuitry, and the secondary side outputs a power signal; and
    a PLC module coupled to the power line and the differential mode choke to receive the PLC signal from the differential mode choke, the PLC module processing the PLC signal and outputting a first control signal.

2. The PLC AC/DC adaptor as claim 1, wherein the PLC module comprises a transformer, an amplifier, a microcontroller, a memory, an antenna, and a coupler, the transformer is coupled between the power line and the amplifier, the microcontroller is coupled to the amplifier, the memory and the coupler, and the antenna is coupled to the memory.

3. The PLC AC/DC adaptor as claim 2, wherein the transformer is an intermediate frequency transformer.

4. The PLC AC/DC adaptor as claim 2, wherein the amplifier is an operational amplifier.

5. The PLC AC/DC adaptor as claim 2, wherein the memory is a non-volatile memory.

6. The PLC AC/DC adaptor as claim 2, wherein the antenna is a radio frequency (RF) antenna.

7. The PLC AC/DC adaptor as claim 2, wherein the coupler is an optical coupler.

8. The PLC AC/DC adaptor as claim 1, wherein the rectifier is a full-bridge rectifier.

9. The PLC AC/DC adaptor as claim 1, wherein the rectifier is a half-bridge rectifier.

10. A PLC AC/DC adaptor, comprising:
    a PLC/differential mode choke set comprising a differential mode choke and a PLC module, an input of the differential mode choke being coupled to a power line carrying a PLC signal and an alternating current to block the PLC signal, the PLC module being coupled to the power line and the differential mode choke to receive the PLC signal from the differential mode choke, the PLC module processing the PLC signal and outputting a first control signal, and
    an AC/DC adaptor;
    wherein an output of the PLC/differential mode choke set is coupled to the AC/DC adaptor through the differential mode choke, the AC/DC adaptor is configured to convert the alternating current to a direct current.

11. The PLC AC/DC adaptor as claim 10, wherein the PLC module comprises a transformer, an operational amplifier, a microcontroller, a memory, an antenna, and a coupler, the transformer is coupled between the power line and the amplifier, the microcontroller is coupled to the amplifier, the memory and the coupler, the antenna is coupled to the memory.

12. The PLC AC/DC adaptor as claim 11, wherein the transformer is an intermediate frequency transformer.

13. The PLC AC/DC adaptor as claim 11, wherein the amplifier is an operational amplifier.

14. The PLC AC/DC adaptor as claim 11, wherein the memory is a non-volatile memory.

15. The PLC AC/DC adaptor as claim 11, wherein the antenna is a radio frequency (RF) antenna.

16. The PLC AC/DC adaptor as claim 11, wherein the coupler is an optical coupler.

* * * * *